United States Patent [19]

Brand

[11] 3,749,427
[45] July 31, 1973

[54] HIGH PRESSURE HOSE COUPLING
[76] Inventor: Karl Brand, Friedlandstrasse 6, 8603 Ebern, Germany
[22] Filed: Feb. 9, 1971
[21] Appl. No.: 113,839

[30] Foreign Application Priority Data
Apr. 1, 1970  Germany .................. P 20 15 552.6

[52] U.S. Cl. .................. 285/382.2, 29/520, 29/523, 285/256, 285/382.4
[51] Int. Cl. ............................................ F16l 13/14
[58] Field of Search .................. 285/256, 259, 258, 285/382.4, 382.5, 382.2, 382, 149; 29/520, 523

[56] References Cited
UNITED STATES PATENTS

| 1,915,041 | 6/1933 | Wallace | 285/149 X |
| 2,433,425 | 12/1947 | Burckle | 285/382.4 X |
| 2,090,251 | 8/1937 | Cowles | 285/382 X |
| 3,589,752 | 6/1971 | Spencer | 285/382.4 X |
| 2,001,204 | 5/1935 | Long et al | 285/382 X |
| 3,525,542 | 8/1970 | Belavt et al | 285/256 |
| 3,433,505 | 3/1969 | Weatherhead | 285/256 X |
| 2,517,606 | 8/1950 | Spender | 285/259 X |

FOREIGN PATENTS OR APPLICATIONS

| 1,092,737 | 11/1960 | Germany | 285/256 |
| 1,425,567 | 1/1969 | Germany | 285/256 |

Primary Examiner—Thomas F. Callaghan
Attorney—Stevens, Davis, Miller & Mosher

[57] ABSTRACT

A coupling for high pressure hose in which an annular portion of an inner member is secured to a bore of an outer member along two separate circumferential regions. In the method of making the coupling the inner member is placed in a central recess in an anvil which has a frusto-conical annular upper end face that is engaged by an end wall of the outer member. A mandrel is forced into the bore of the inner member to deform its wall into engagement with the wall of the bore of the sleeve both at the end of the mandrel and at the end of the anvil.

1 Claim, 8 Drawing Figures

PATENTED JUL 31 1973

INVENTOR
KARL BRAND

BY Stevens, Davis, Miller & Mosher
ATTORNEYS

HIGH PRESSURE HOSE COUPLING

The present invention relates to an end coupling for high pressure hoses, for example for hoses for use in hydraulic brakes for vehicles, the end coupling being of the type having an inner member that enters the end of the hose proper and an outer member which is provided at one end with internal or external means for engagement with a hydraulic cylinder or other component, the other end of the outer member being in the form of a skirt which is capable of being deformed inwards to grip the hose material and clamp it between the outer member and the inner member within the hose.

The present invention relates in particular to the construction of the end coupling so that its inner member and outer member are sealed together in a fluid-tight manner and the invention also relates to a method of assembling the end coupling.

Various means and methods are already known for securing together the inner and the outer members of a hose coupling in a fluid-tight manner against the high pressures developed in the hose in question. For example, it is known for the inner member to have an external surface which diverges towards that end which is furthest from the main body of the hose in the assembled structure, and for the outer member to have a correspondingly tapered internal bore; the inner member being forced into the outer member from the screw-threaded end of the latter. In an alternative construction, the bore of the outer member tapers convergently towards its screw-threaded end with a shoulder at the smaller end of the conical bore joining this bore to a further bore of reduced diameter. The inner member, of which the external surface tapers towards the end furthest from the body of the hose, is forced into the outer member from the larger end of the latter until it engages against the shoulder. In yet another construction the inner member is in the form of a substantially plain cylindrical tube initially and the outer member has an internal bore which is conical at that end which is towards the main body of the hose and tapers towards the screw-threaded end, to meet a portion of smaller diameter at an annular shoulder. The tubular inner member is expanded to engage against the conical wall of the bore of the outer member. Alternatively, again with an inner member which is initially a plain tubular form, the bore of the outer member is largely of plain cylindrical form but that end of the bore which is towards the main body of the hose tapers convergently towards this end. In the first case the inner member is forced axially into the outer member from the hose end of the outer member, whilst in the second case the inner member is forced axially into the outer member from the screw-threaded end of the latter. In this last case, in place of the conical portion of the bore of the outer member, there could simply be a stepped portion against which the inner member is forced. Finally, it is also known to have an inner member of rigid form and an outer member which is capable of plastic deformation and has a bore made up of a portion of smaller diameter nearest the screw-threaded end of the outer member and a portion of larger diameter towards the other end; the inner member, which is forged from a smooth uniform length of tubing, has a frusto-conical end face which engages against the shoulder between the portions of larger and smaller diameter of the bore in the outer member and then the inner member is peened over or inert-gas welded at its point of emergence from the bore of the outer member.

Higher and higher standards are constantly being set for the degree of fluid-tightness and security between the components of hose couplings, especially those intended for use on hydraulic brake hoses for vehicles. The fluid-tightness between couplings and hoses is quality-tested by observing the increase in volume when the pressure of the hydraulic medium present in the hose under test is increased in successive steps, a longer and longer time interval being interposed between successive increase in pressure so that any possible loss of fluid is made more noticeable. Moreover, no expansion or formation of bulges must be observable in the wall of the hose and, more important, no hydraulic fluid must penetrate into the material of the hose, for example by partial leakage at the end in the coupling.

Penetration of hydraulic fluid into the body of the hose, for example at the end, must be avoided as it results in damage to the strength of the fabric reinforcement in the hose. It has been found that with many of the known hose couplings the connection between the inner member and the outer member of the coupling allows a seepage of the hydraulic fluid to occur after several months of use. The stresses set up in the material of the coupling on initial assembly tend to disappear with time, especially in view of the limited wall thickness of the components of the coupling. Where an attempt is made to obtain additional security by use of welding, there is danger of weld cracks being formed, resulting in consequent sealing failures under the continuously varying pressure loadings to which the coupling is subjected. In the last of the known methods of assembly mentioned above, in which the rigid inner member has a frusto-conical end face engaging a shoulder in the bore of the outer member, there is the further disadvantage that inevitable tolerances in the bore size of the outer member and in the external diameter of the inner member mean that complete sealing between these two components is not always achieved, and the same is true because of lack of roundness of the frusto-conical face as a consequence of the manufacturing methods. Thus, sealing failures can be expected at the circumferential sealing point between the end face of the inner member and the shoulder in the bore of the outer member. The possibility has therefore been considered of taking additional steps in the form of forging or swaging or welding of the inner member but even this does not allow complete elimination of seepage of fluid at very high pressures and over long periods of time.

It is therefore an object of the present invention to provide a hose coupling, and a method of assembling it, which is suitable for use on high pressure hoses, for example for vehicle braking systems, and capable of maintaining its fluid-tightness at pressures up to as much as four-hundred or five-hundred atmospheres.

This is achieved in a high pressure hose coupling of the kind outlined above in that, between the inner member portion of the coupling and the outer member there are provided at least two separate circumferentially extending sealing regions produced by deformation. Preferably the second circumferential sealing region is in the form of an annular constriction in the wall of the inner member, engaged by an inner edge, pressing into the inner member, of the bore of the outer member near the screw-threaded end of the latter. In addition to this region or instead of it, there may also be a bulge or portion of increased cross-section in that region of the inner member which is furthest from the main body of the hose, this bulge being pressed against the wall of an increased-diameter portion of the bore of the outer member near the screw-threaded end of the outer member, the inner member being forced into this bore.

Also, the invention concerns a method for manufacturing a coupling for high pressure hoses of the kind comprising an inner member, which is inserted into the bore in an outer member, in which, as the inner member is forced into the outer member the inner member is deformed against the wall of the bore of the outer member to form an additional circumferential sealing region. Preferably the outer member, with the inner member already in place in it, is set up on an anvil which has a central bore to receive the inner member and has at its upper end a flat frusto-conical annular bearing face for the outer member, this face being concave towards the central bore, and then the outer member is forced downwards against the anvil so that the frusto-conical face deforms the material of the edge of the outer member inwards against the wall of the inner member, forming a constriction in the latter, whilst in addition a ball-like mandrel is forced at least partially into the bore of the inner member to deform the wall thereof laterally outwards against the wall of the bore of the outer member. The bore of that portion of the outer member which is engaged by the inner member may be of uniform diameter or it may have a portion of increased diameter near the screw-threaded end.

The means for accomplishing the foregoing objects and other advantages, which will be apparent to those skilled in the art, are set forth in the following specification and claims, and are illustrated in the accompanying drawings dealing with a basic embodiment of the present invention. Reference is made now to the drawings in which:

Figure 1:
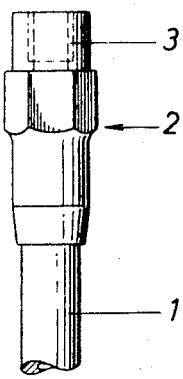
FIG. 1 is an external elevation of a hose coupling according to the invention, mounted on the end of a length of hose.
Figure 4:
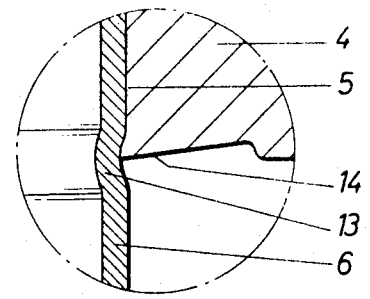
FIG. 4 shows, on an enlarged scale, the portion of an assembled coupling noted by IV in FIG. 2.

Referring first to FIG. 1, the end of a flexible high pressure hose 1 is received in an end coupling 2 by which it can be connected in a fluid-tight manner to a component such as a hydraulic cylinder or valve, this coupling 2 being provided for this puroose with connection means 3. It will be understood that instead of the internal thread shown, an external screw-thread or even some other form of connection means could be provided. An enlarged intermediate portion of the length of the fitting has an external hexagonal shape to allow it to be screwed to the component by means of a wrench.

The coupling comprises an inner member 6 of basically plain tubular form, received in an outer member 4 on which the hexagonal portion is formed and of which one end carries the connecting means 3. The other end of the outer member forms the skirt which is capable of radial inward deformation by an appropriate tool in a manner not shown, so as to secure in a fluid-tight manner the end of the hose 1 between the inner member 6 and the skirt of the outer member 4.

Figure 2:
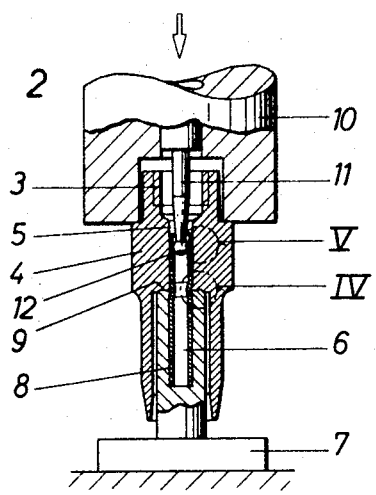
FIG. 2 is a largely sectioned side view of one embodiment of the coupling according to the invention, during its assembly on an anvil.
Figure 7:
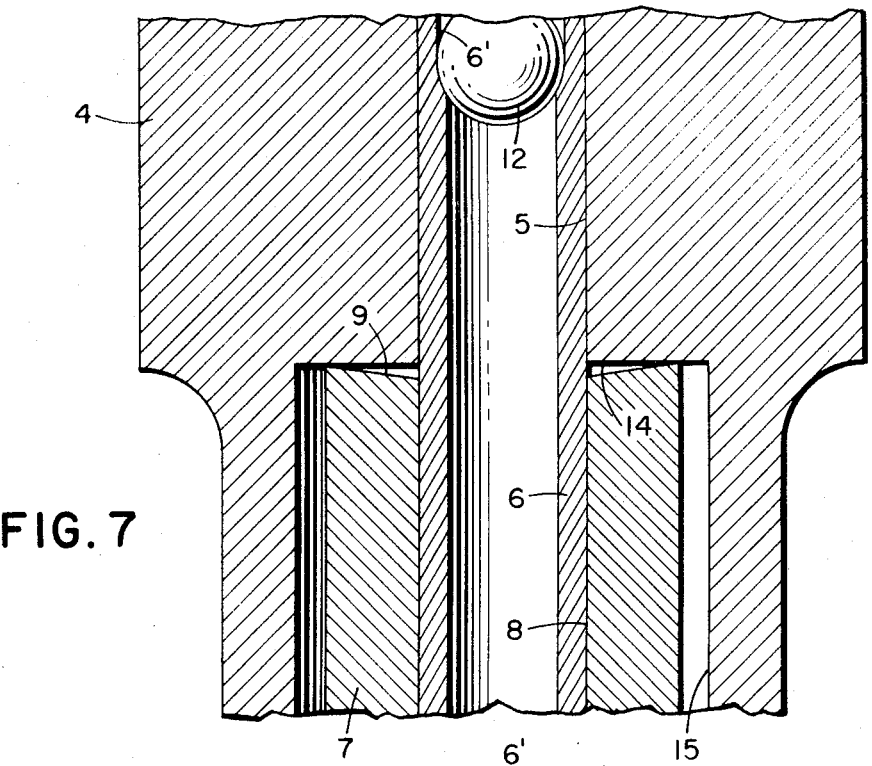
FIG. 7 is an enlarged detailed vertical section of the coupling during assembly.
Figure 8:
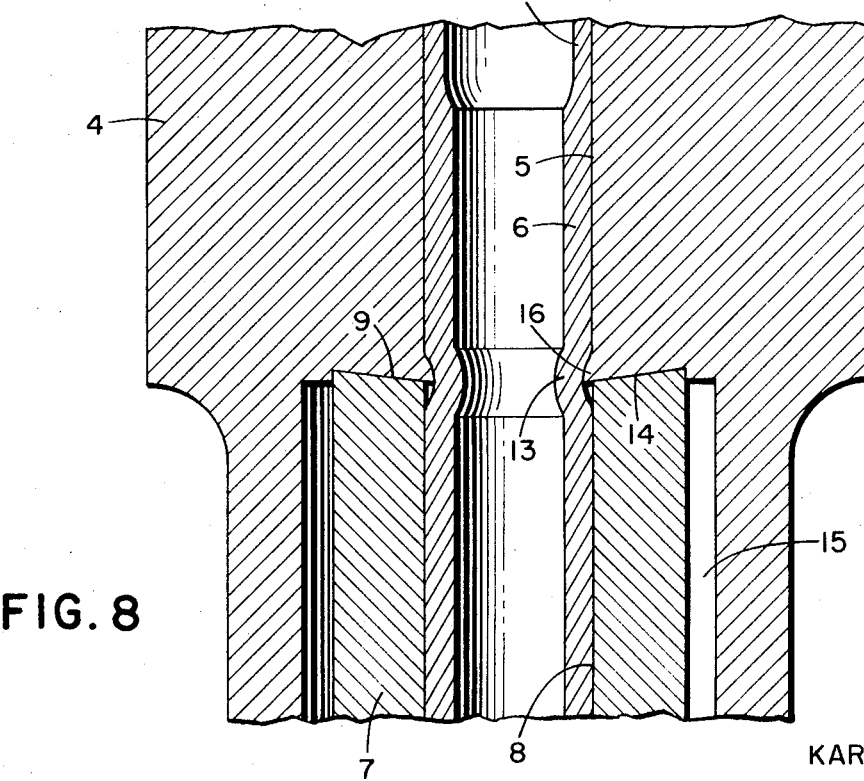
FIG. 8 is an enlarged detailed vertical section of the completed coupling before dismounting from the anvil.

As shown in FIG. 2, to assemble the inner member and the outer member together, the inner member 6 is first inserted in the bore 5 of the outer member (this bore being of uniform diameter in the version shown in FIG. 2) and then the outer member is fitted over an upstanding portion of an anvil 7, which has an axial bore 8 to receive the lower end of the inner member 6. The upper end of the anvil is in the form of a frusto-conical concave surface 9. When a tool 10 is used to force the outer member downwards onto the anvil, this frusto-conical surface, as shown in FIGS. 7 and 8, forces the material 16 of the outer member at the shoulder 14 between the bore 5 and the enlarged counter bore 15, that is shaped to receive the end of the hose, radially inwards to deform the wall of the inner member at this point forming a slight constriction and at the same time forming a very effective circumferentially extending sealing region between the inner member 6 and the outer member 4.

Figure 5:
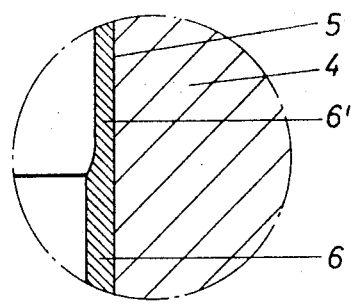
FIG. 5 shows, on an enlarged scale, the portion of an assembled coupling noted by V in FIG. 2.

In addition, the tool 10 forms a guide for a mandrel 11 having a ball head 12 that is forced downwards into the bore 5 of the inner member 6, deforming the wall thereof laterally outwards tightly into engagement with the wall of the bore 5 of the outer member, at the same time reducing the wall thickness of the inner member 6. This portion 6' of reduced diameter is most clearly shown in FIGS. 5, 7 and 8 and constitutes a second circumferentially extending sealing region between the outer member and the inner member. Normally the mandrel 11 can be forced downwards first to form this seal, after which the tool 10 is struck to produce the other sealing region at the shoulder 14. However, it will be understood that these steps may be performed in the reverse order or simultaneously.

Figure 3:
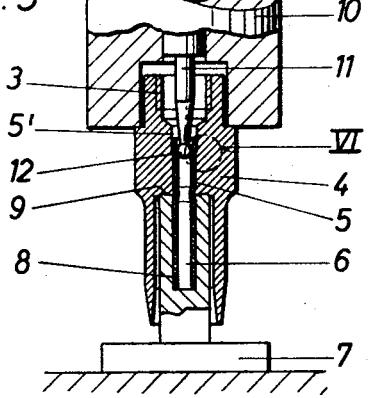
FIG. 3 is a view similar to FIG. 2, showing an alternative embodiment of the coupling according to the invention, during its assembly on an anvil.
Figure 6:
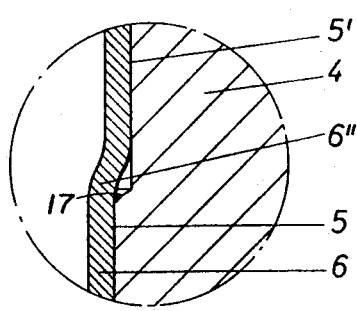
FIG. 6 shows, on an enlarged scale, the portion of an assembled coupling noted by VI in FIG. 3.

The hose end fitting shown in FIG. 3 differs from that of FIG. 2 only in that the bore 5 of the central region of the outer member 4, instead of being of uniform diameter, has in it a step 17 of increased diameter towards the end having connection means 3. The ball head 12 on the end of the mandrel 11 deforms the wall of the inner member 6 outwards to fit this enlarged diameter, resulting in an enlarged portion 6'' of the inner member 6 that cooperates with the step 17 or shoulder between the portions of smaller and larger diameter 5 and 5', respectively, of the bore in the outer member, thus forming a further circumferentially extending sealing region between the outer member 4 and the inner member 6 at this point.

The outer member 4 and the inner member 6, as well as the hose 1 itself, can be made of the usual materials employed for these components. For example, the inner member 6 can be of brass or steel tube and the outer member 4 can be formed of free-cutting steel.

The anvil 7, the tool 10 and the mandrel 11 with its head 12, are preferably made of hardened steel.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

What is claimed:

1. A hose coupling comprising a body carrying a connecting means on one end and a skirt on the other end, a bore through the body, a counterbore through the skirt of greater cross-section than the bore through the body, a radial shoulder at the point of intersection of the bore and the counterbore, a tubular sleeve having a first portion disposed in said bore and a second portion disposed in the counterbore, said shoulder being deformed radially inwardly to engage said sleeve and to deform the sleeve wall to form an annular depression therein thereby securing the sleeve and body against relative movement, and said first portion of said sleeve having a substantially cylindrical end section plastically deformed into less wall thickness than the remainder thereof and pressed outwardly against the wall of the bore to thereby secure said end section of the sleeve against movement relative to the body.

* * * * *